United States Patent [19]

Mizuno et al.

[11] Patent Number: 4,924,299

[45] Date of Patent: May 8, 1990

[54] IMAGE DISPLAY DEVICE DISPLAYING A COMPOSITE CHARACTER AND GRAPHIC COLOR IMAGE

[75] Inventors: Yutaka Mizuno; Hideyuki Takamuku, both of Hachioji, Japan

[73] Assignee: Fanuc Ltd., Yamanashi, Japan

[21] Appl. No.: 210,582

[22] PCT Filed: Sep. 21, 1987

[86] PCT No.: PCT/JP87/00693

§ 371 Date: Jul. 13, 1988

§ 102(e) Date: Jul. 13, 1988

[87] PCT Pub. No.: WO88/02163

PCT Pub. Date: Mar. 24, 1988

[30] Foreign Application Priority Data

Sep. 22, 1986 [JP] Japan .............................. 61-222137

[51] Int. Cl.[5] ......................... H04N 9/76; G09G 1/28

[52] U.S. Cl. ...................................... 358/22; 340/703; 340/729; 340/734

[58] Field of Search ......................... 358/22, 183, 903; 340/701, 703, 730, 734, 747, 729

[56] References Cited

U.S. PATENT DOCUMENTS 4,827,251 5/1989 Aoki .................................... 358/22

FOREIGN PATENT DOCUMENTS 105783 7/1982 Japan .

*Primary Examiner*—Tommy P. Chin

*Attorney, Agent, or Firm*—Armstrong, Nikaido, Marmelstein, Kubovcik & Murray

[57] ABSTRACT

An image display apparatus wherein an existence of a plurality of color factors which constitute pixels of a character image (1) and a graphic image (2) which have corresponding pixels is expressed by a logical value rotation, the logical values of the color factors of the character image (1) and the graphic image (2) for the corresponding pixels are operated logically, and a composite image (3) consisting of the character image and the graphic image is displayed, comprises a logical operation circuit wherein when at least one color factor of the character image (1) exists for pixels, not all the color factors of the graphic image (2) for the pixels are displayed. By using this apparatus, the character image is easily distinguished from the background image.

2 Claims, 3 Drawing Sheets

IMAGE DISPLAY DEVICE DISPLAYING A COMPOSITE CHARACTER AND GRAPHIC COLOR IMAGE

TECHNICAL FIELD

The present invention relates to an image display apparatus displaying a composite image of a character image and a graphic image in color.

BACKGROUND ART

In an image display apparatus displaying a composite color picture on a display device by mixing a character (letter) picture and a graphic (figure) picture, the existence of color factors (e.g., three primary colors: red, green, blue) constituting each pixel is expressed by a logical value "1", and a nonexistence is expressed by "0", color factors showing a character picture and color factors showing a graphic picture, pixels which corresponding to each other on the pictures are logically summed using logical summation circuits, and the summation is a logical value showing an existence of the color factor of the composite picture. As a result, a superposed composite image of the character picture and the graphic picture is obtained, the character and the graph having colors are superposed, and thus the colors are additively mixed. Since this apparatus uses the logical summation circuits as hardware, an advantage exists of a simple circuit constitution, but a problem arises in that distinction of the character becomes difficult when the character is superposed onto a complicated figure having many colors.

DISCLOSURE OF THE INVENTION

An object of the present invention is to provide an image display apparatus wherein a color display of a character image has priority over a color display of a graphic image, the color of the character image is not easily affected by the color of the superposed graphic image, and the character image can be easily distinguished from the background image thereof.

To solve the above-mentioned problem, in the present invention, there is provided an image display apparatus wherein an existence of a plurality of color factors which constitute pixels of a character image and a graphic image which have corresponding pixels is expressed by a logical value notation, the logical values of the color factors of the character image and the graphic image for the corresponding pixels are operated logically, and the composite image consisting of the character image and the graphic image is displayed, comprising a logical operation circuit in which, when at least one color factor of the character image exists for the pixels, not all the color factors of the graphic image for the pixels are displayed. By using the above-mentioned apparatus according to the invention, the letter of the character image is displayed on the composite image without a color change, and thus the letter can be displayed distinctively since the color of the figure of the graphic image does not affect the color of the letter.

BEST MODE FOR CARRYING OUT THE INVENTION

Figure 1:
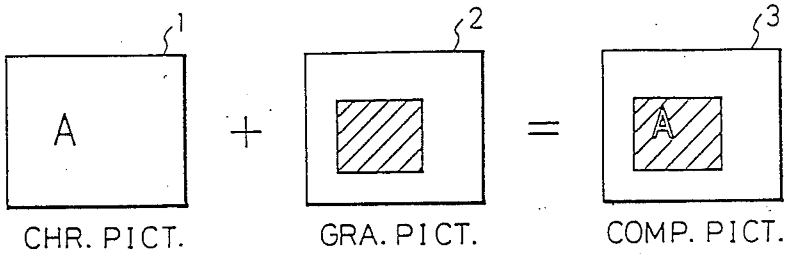
FIG. 1 is a diagram explaining the present invention.

An apparatus of the invention, as shown in FIG. 1, for example, a character on a character picture (CHR. PICT.) 1 is displayed on a composite picture (COMP. PICT.) 3 while the color thereof is maintained as is, and displays a graphic figure in color, as shown by a graphic picture (GRA. PICT.) 2, by oblique lines so that the color of the graphic figure does not affect the color of the character. In FIG. 1, the character of the composite picture is shown as white for convenience due to a monochromatic expression. In an embodiment of the present invention, when a color of a character on a character picture is the same as a color of the corresponding pixel of a figure on a graphic picture, the color of the character is made black.

Figure 2:
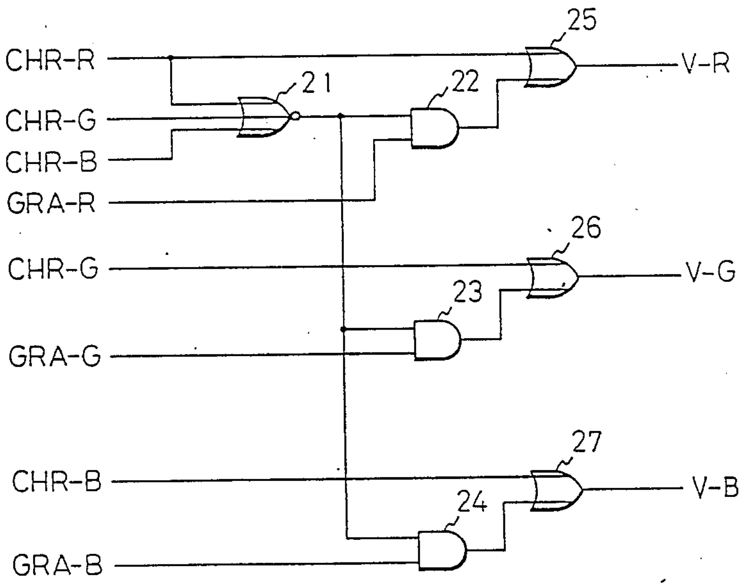
FIG. 2 is a diagram showing a logical operation circuit of an image display apparatus according to an embodiment of the invention.

FIG. 2 shows a logical operation circuit for forming a composite image signal by mixing a character image signal and a graphic image signal in an image display apparatus according to an embodiment of the invention.

In this embodiment, red (R), green (G), and blue (B) in the three primary colors are used as color factors. In the figure, CHR is added to the color factors of the character image, and GRA is added to the color factors of the graphic image. The logical operation circuit of this embodiment comprises a NOR gate 21, AND gates 22, 23, and 24, and OR gates 25, 26, and 27. A logical signal showing the red of the character image (HR-R assuming that when the primary color red is included, the logical value is "1", and when not included, the logical value is "0") is supplied to a first input of the NOR gate 21 and a first input of the OR gate 25. A logical signal showing the green of the character image CHR-G is supplied to a second input of the NOR gate 21 and a first input of the OR gate 26. A logical signal showing the blue of the character image CHR-B is supplied to a third input of the NOR gate 21 and a first input of the OR gate 27. A logical signal showing the red of the graphic image GRA-R is supplied to a second input of the AND gate 22, a logical signal showing the green of the graphic image GRA-G is supplied to a second input of the AND gate 23, and a logical signal showing the blue of the graphic image GRA-B is supplied to a second input of the AND gate 24. An output of the NOR gate 21 is connected to first inputs of the AND gates 22, 23, and 24. Outputs of the AND gates 22, 23, and 24 are connected to second inputs of the OR gates 25, 26, and 27, respectively. Outputs of the OR gates 25, 26, and 27 are output as a video signal red output V-R, a video signal green output V-G, and a video signal blue output V-B, respectively.

An operation of the circuit in FIG. 2 is explained below. If any one of the signals in a pixel, CHR-R, CHR-G, and CHR-B in the character image, is "1", the output of the NOR gate 21 is "0", and the outputs of the AND gates 22 to 24 become "0". Therefore, the signals GRA-R, GRA-G, and GRA-B of the corresponding pixel in the graphic image do not have any affect on the output signals V-R, V-G, and V-B, and the values of the signals CHR-R, CHR-G, and CHR-B are output as the outputs V-R, V-G, and V-B, respectively. Thus, using this logical operation circuit, when any one of the signals CHR-R, CHR-G, and CHR-B exists, the signal is output as it is. The signals of the graphic image GRA-R, GRA-G, and GRA-B are not output.

Figure 3:
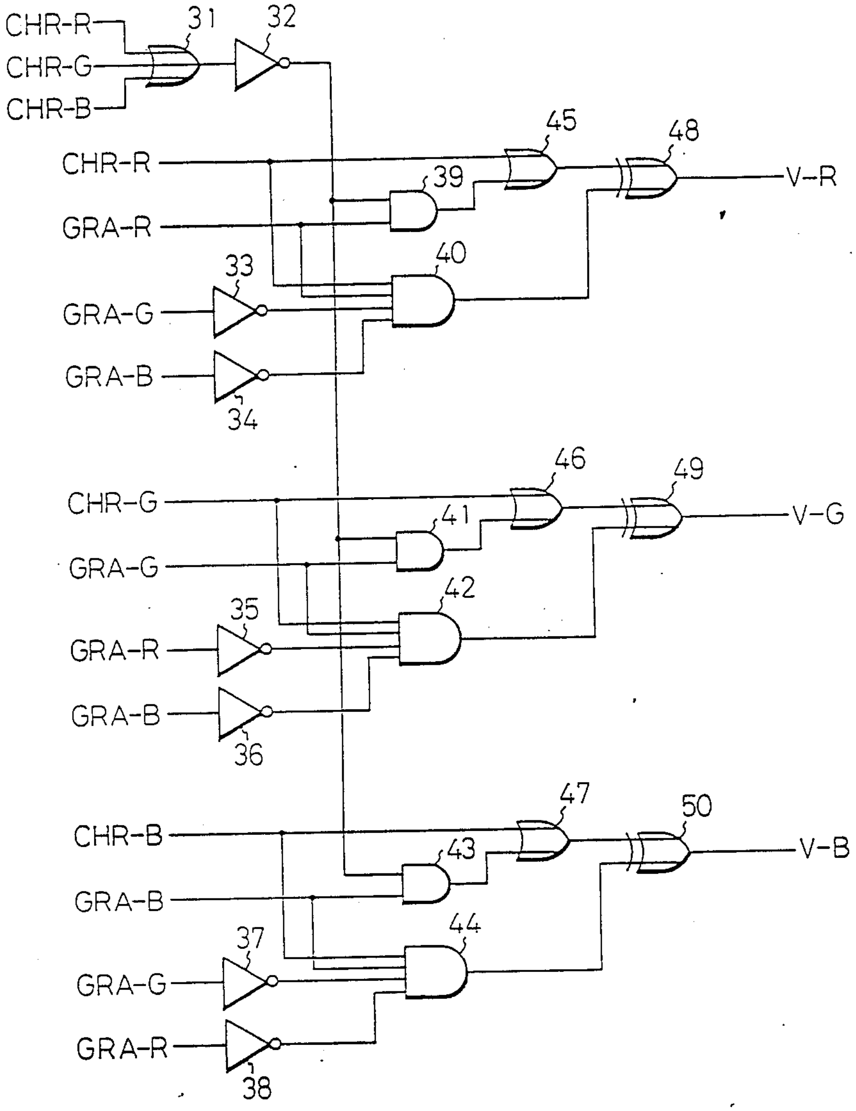
FIG. 3 is a circuit diagram showing a logical operation circuit in another embodiment of the invention.

FIG. 3 shows a logical operation circuit according to another embodiment of the invention. This circuit comprises OR gates 31, 45, 46, and 47, NOT circuits 32, 33, 34, 35, 36, 37, and 38, AND gates 39, 40, 41, 42, 43, and 44, and exclusive OR gates 48, 49, and 50.

The signal CHR-R is supplied to a first input of the OR gate 31, a first input of the OR gate 45, and a first input of the AND gate 40. The signal CHR-G is supplied to a second input of the OR gate 31, a first input of the OR gate 46, and a first input of the AND gate 42. The signal CHR-B is supplied to a third input of the OR gate 31, a first input of the OR gate 47, and a first input of the AND gate 44. An output of the OR gate 31 is supplied to first inputs of the AND gates 39, 41, and 43 through the NOT circuit 32. The signal GRA-R is supplied to a second input of the AND gate 39, a second input of the AND gate 40, and the NOT circuits 35 and 38. The signal GRA-G is supplied to the NOT circuits 33 and 37, a second input of the AND gate 41, and a second input of the AND gate 42. The signal GRA-B is supplied to the NOT circuits 34 and 36, a second input of the AND gate 43, and a second input of the AND gate 44.

An output of the AND gate 39 is connected to a second input of the OR gate 45, an output of the NOT circuit 33 is connected to a third input of the AND gate 40, and an output of the NOT circuit 34 is connected to a fourth input of the AND gate 40. An output of the OR gate 45 is connected to a first input of the exclusive OR circuit 48, and an output of the AND gate 40 is connected to a second input of the exclusive OR circuit 48. An output of the exclusive OR circuit 48 is output as a video signal red output V-R.

An output of the AND gate 41 is connected to a second input of the OR gate 46, an output of the NOT circuit 35 is connected to a third input of the AND gate 42, and an output of the NOT circuit 36 is connected to a fourth input of the AND gate 42. An output of the OR gate 46 is connected to a first input of the exclusive OR circuit 49, and an output of the AND gate 42 is connected to a second input of the exclusive OR circuit 49. An output of the exclusive OR circuit 49 is output as a video signal green output V-G.

An output of the AND gate 43 is connected to a second input of the OR gate 47, an output of the NOT circuit 37 is connected to a third input of the AND gate 44, and an output of the NOT circuit 38 is connected to a fourth input of the AND gate 44. An output of the OR gate 47 is connected to a first input of the exclusive OR gate 50, and an output of the AND gate 44 is connected to a second input of the exclusive OR circuit 50. An output of the exclusive OR circuit 50 is output as a video signal blue output V-B.

Figure 4:
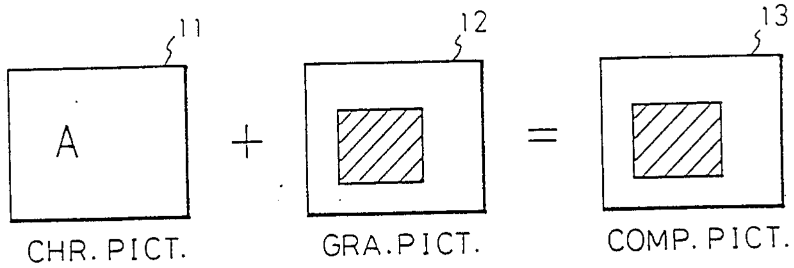
FIG. 4 is a diagram explaining a conventional apparatus.

In this embodiment, circuits of the AND gates 40, 42, and 44 have been added, compared with the previously-mentioned embodiment, and therefore, for example, the output of the AND gate 40 is "1" when the signals CHR-R and GRA-R are "1" and the signals GRA-G and GRA-B are "0". Namely, when the red signal exists for the character image and the graphic image and neither the green nor the blue signal exist for the graphic image the signal V-R becomes "0". By addition of this circuit, for example, if both the color of a pixel of the character image and the color of the corresponding pixel of the graphic image are red, the signal V-R outputs "0", and thus the color becomes black. In the conventional apparatus, since the composite picture is made by a simple superposition of the character picture and the graphic picture, as shown in FIG. 4, if the character in the character picture 11 is red and the figure expressed by oblique lines in the graphic picture 12 is also red, a distinction therebetween is not made in the composite picture 13. However, in this embodiment, the character is distinguished from the red oblique portion since the character is black. This is a state wherein no color exists. (conf. composite picture 3 in FIG. 1)

The above description is the same as for those colors other than red, i.e., green and blue.

We claim:

1. An image display apparatus having a plurality of color factors constituting each pixel on a character image and a graphic image, wherein each respective corresponding pixel is expressed by logical values, wherein the logical values of the color factors of the corresponding pixel on the character image and the graphic image are logically operated, and a composite image of the character image and the graphic image is expressed, the image display apparatus, comprising:

a logical operation circuit means, including a means for preventing the display of a color factor on the graphic image of a pixel when at least one color factor on the character image exists for the pixel; and a means for preventing the display of a color factor on the character image when the color factor constituting the pixel of the character image is identical to the color factor constituting the corresponding pixel of the graphic image.

2. An image display apparatus as set forth in claim 1, wherein the logical values of the color factors on the character image and the graphic image are expressed as logical values for red, green, and blue, and wherein the logical operation circuit means comprises:

a three-input OR gate for receiving a logical value of the red, a logical value of the green, and a logical value of the blue on the character image, a first two-input AND gate receiving an inverted output of the three-input OR gate and a logical value of the red on the graphic image, a second two-input AND gate for receiving the inverted output of the three-input OR gate and a logical value of the green on the graphic image, a third two-input AND gate for receiving the inverted output of the three-input OR gate and a logical value of the blue on the graphic image, a first two-input OR gate for receiving a logical value of the red on the character image and an output of the first two-input AND gate, a second two-input OR gate for receiving a logical value of the green on the character image and an output of the second two-input AND gate, a third two-input OR gate for receiving a logical value of the blue on the character image and an output of the third two-input AND gate, a first four-input AND gate for receiving a logical value of the red on the character image, a logical value of the red on the graphic image, an inverted logical value of the green on the graphic image, and an inverted logical value of the blue on the graphic image, a second four-input AND gate for receiving a logical value of the green on the character image, a logical value of the green on the graphic image, an inverted logical value of the red on the graphic image, an inverted logical value of the blue on the graphic image, a third four-input AND gate for receiving a logical value of the blue on the character image, a logical value of the blue on the graphic image, an inverted logical value of the green on the graphic image, and an inverted logical value of the red on the graphic image, a first exclusive OR gate for receiving an output of the first two-input OR gate and an output of the first four-input AND gate, a second exclusive OR gate for receiving an output of the second two-input OR gate and an output of the second four-input AND gate, and a third exclusive OR gate for receiving an output of the third two-input OR gate and an output of the third four-input AND gate.

* * * * *